(12) United States Patent
Kazi et al.

(10) Patent No.: US 11,741,125 B2
(45) Date of Patent: *Aug. 29, 2023

(54) STORAGE NETWORK FOR REBUILDING FAILED SLICES

(71) Applicant: Pure Storage, Inc., Mountain View, CA (US)

(72) Inventors: Asimuddin Kazi, Naperville, IL (US); Jason K. Resch, Warwick, RI (US)

(73) Assignee: Pure Storage, Inc., Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/810,928

(22) Filed: Jul. 6, 2022

(65) Prior Publication Data

US 2022/0335060 A1 Oct. 20, 2022

Related U.S. Application Data

(63) Continuation of application No. 17/097,140, filed on Nov. 13, 2020, now Pat. No. 11,409,767, which is a
(Continued)

(51) Int. Cl.
*G06F 16/27* (2019.01)
*G06F 3/06* (2006.01)
(Continued)

(52) U.S. Cl.
CPC .............. *G06F 16/27* (2019.01); *G06F 3/064* (2013.01); *G06F 3/067* (2013.01); *G06F 3/0619* (2013.01);
(Continued)

(58) Field of Classification Search
CPC ........ G06F 16/27; G06F 3/067; G06F 3/0659; G06F 3/0619; G06F 3/0689;
(Continued)

(56) References Cited

U.S. PATENT DOCUMENTS 4,092,732 A 5/1978 Ouchi
5,454,101 A 9/1995 Mackay
(Continued)

OTHER PUBLICATIONS

Chung; An Automatic Data Segmentation Method for 3D Measured Data Points; National Taiwan University; pp. 1-8; 1998.
(Continued)

*Primary Examiner* — Mark A Giardino, Jr.
(74) *Attorney, Agent, or Firm* — Garlick & Markison; Timothy W. Markison; Bruce E. Stuckman

(57) ABSTRACT

A storage network operates by: encoding, via a dispersed error encoding, at least one data object as a write threshold number of encoded data slices; storing the write threshold number of the encoded data slices in a set of storage units of the storage network; determining when, due to a failure of at least one of the set of storage units, less than a pillar width number of the encoded data slices of a common revision are retrievable from the set of storage units: retrieving a decode threshold number of the encoded data slices from others of the set of storage units; decoding the decode threshold number of the encoded data slices to reproduce the at least one data object; restoring availability of the pillar width number of the encoded data slices of the common revision by: rebuilding at least a subset of encoded data slices of the set of encoded data slices, based on an encoding of the at least one data object; and storing the at least a subset of encoded data slices in the storage network.

20 Claims, 6 Drawing Sheets

Related U.S. Application Data continuation of application No. 16/297,978, filed on Mar. 11, 2019, now Pat. No. 10,853,388, which is a continuation of application No. 15/822,873, filed on Nov. 27, 2017, now Pat. No. 10,331,698, which is a continuation-in-part of application No. 15/400,092, filed on Jan. 6, 2017, now Pat. No. 10,057,351, which is a continuation-in-part of application No. 15/223,707, filed on Jul. 29, 2016, now Pat. No. 10,013,471, which is a continuation of application No. 13/959,702, filed on Aug. 5, 2013, now Pat. No. 9,424,326.

(60) Provisional application No. 61/700,691, filed on Sep. 13, 2012.

(51) Int. Cl.
| | | |
|---|---|---|
| *H04L 67/1097* | (2022.01) | |
| *G06F 16/178* | (2019.01) | |
| *H04L 67/00* | (2022.01) | |
| *G06F 11/10* | (2006.01) | |

(52) U.S. Cl.
CPC .......... *G06F 3/0659* (2013.01); *G06F 3/0689* (2013.01); *G06F 11/1076* (2013.01); *G06F 16/178* (2019.01); *H04L 67/1097* (2013.01); *H04L 67/34* (2013.01)

(58) Field of Classification Search
CPC .... G06F 16/178; G06F 11/1076; G06F 3/064; H04L 67/1097; H04L 67/34
See application file for complete search history.

(56) References Cited

U.S. PATENT DOCUMENTS

| | | |
|---|---|---|
| 5,485,474 A | 1/1996 | Rabin |
| 5,774,643 A | 6/1998 | Lubbers |
| 5,802,364 A | 9/1998 | Senator |
| 5,809,285 A | 9/1998 | Hilland |
| 5,890,156 A | 3/1999 | Rekieta |
| 5,987,622 A | 11/1999 | Lo Verso |
| 5,991,414 A | 11/1999 | Garay |
| 6,012,159 A | 1/2000 | Fischer |
| 6,058,454 A | 5/2000 | Gerlach |
| 6,128,277 A | 10/2000 | Bruck |
| 6,175,571 B1 | 1/2001 | Haddock |
| 6,192,472 B1 | 2/2001 | Garay |
| 6,256,688 B1 | 7/2001 | Suetaka |
| 6,272,658 B1 | 8/2001 | Steele |
| 6,301,604 B1 | 10/2001 | Nojima |
| 6,356,949 B1 | 3/2002 | Katsandres |
| 6,366,995 B1 | 4/2002 | Nikolaevich |
| 6,374,336 B1 | 4/2002 | Peters |
| 6,415,373 B1 | 7/2002 | Peters |
| 6,418,539 B1 | 7/2002 | Walker |
| 6,449,688 B1 | 9/2002 | Peters |
| 6,457,065 B1 | 9/2002 | Rich |
| 6,567,948 B2 | 5/2003 | Steele |
| 6,571,282 B1 | 5/2003 | Bowman-Amuah |
| 6,609,223 B1 | 8/2003 | Wolfgang |
| 6,718,361 B1 | 4/2004 | Basani |
| 6,760,808 B2 | 7/2004 | Peters |
| 6,785,768 B2 | 8/2004 | Peters |
| 6,785,783 B2 | 8/2004 | Buckland |
| 6,826,711 B2 | 11/2004 | Moulton |
| 6,879,596 B1 | 4/2005 | Dooply |
| 7,003,688 B1 | 2/2006 | Pittelkow |
| 7,024,451 B2 | 4/2006 | Jorgenson |
| 7,024,609 B2 | 4/2006 | Wolfgang |
| 7,080,101 B1 | 7/2006 | Watson |
| 7,103,824 B2 | 9/2006 | Halford |
| 7,103,915 B2 | 9/2006 | Redlich |
| 7,111,115 B2 | 9/2006 | Peters |
| 7,140,044 B2 | 11/2006 | Redlich |
| 7,146,644 B2 | 12/2006 | Redlich |
| 7,171,493 B2 | 1/2007 | Shu |
| 7,222,133 B1 | 5/2007 | Raipurkar |
| 7,240,236 B2 | 7/2007 | Cutts |
| 7,272,613 B2 | 9/2007 | Sim |
| 7,467,265 B1 | 12/2008 | Tawri |
| 7,636,724 B2 | 12/2009 | De La Torre |
| 8,676,851 B1 | 3/2014 | Nesbit |
| 2002/0062422 A1 | 5/2002 | Butterworth |
| 2002/0166079 A1 | 11/2002 | Ulrich |
| 2003/0018927 A1 | 1/2003 | Gadir |
| 2003/0037261 A1 | 2/2003 | Meffert |
| 2003/0065617 A1 | 4/2003 | Watkins |
| 2003/0084020 A1 | 5/2003 | Shu |
| 2004/0024963 A1 | 2/2004 | Talagala |
| 2004/0122917 A1 | 6/2004 | Menon |
| 2004/0215998 A1 | 10/2004 | Buxton |
| 2004/0228493 A1 | 11/2004 | Ma |
| 2005/0100022 A1 | 5/2005 | Ramprashad |
| 2005/0114594 A1 | 5/2005 | Corbett |
| 2005/0125593 A1 | 6/2005 | Karpoff |
| 2005/0131993 A1 | 6/2005 | Fatula, Jr. |
| 2005/0132070 A1 | 6/2005 | Redlich |
| 2005/0144382 A1 | 6/2005 | Schmisseur |
| 2005/0229069 A1 | 10/2005 | Hassner |
| 2006/0047907 A1 | 3/2006 | Shiga |
| 2006/0136448 A1 | 6/2006 | Cialini |
| 2006/0156059 A1 | 7/2006 | Kitamura |
| 2006/0224603 A1 | 10/2006 | Correll, Jr. |
| 2007/0079081 A1 | 4/2007 | Gladwin |
| 2007/0079082 A1 | 4/2007 | Gladwin |
| 2007/0079083 A1 | 4/2007 | Gladwin |
| 2007/0088970 A1 | 4/2007 | Buxton |
| 2007/0174192 A1 | 7/2007 | Gladwin |
| 2007/0214285 A1 | 9/2007 | Au |
| 2007/0234110 A1 | 10/2007 | Soran |
| 2007/0283167 A1 | 12/2007 | Venters, III |
| 2009/0094251 A1 | 4/2009 | Gladwin |
| 2009/0094318 A1 | 4/2009 | Gladwin |
| 2010/0023524 A1 | 1/2010 | Gladwin |
| 2011/0161754 A1 | 6/2011 | Baptist |

OTHER PUBLICATIONS

Harrison; Lightweight Directory Access Protocol (LDAP): Authentication Methods and Security Mechanisms; IETF Network Working Group; RFC 4513; Jun. 2006; pp. 1-32.
Kubiatowicz, et al.; OceanStore: An Architecture for Global-Scale Persistent Storage; Proceedings of the Ninth International Conference on Architectural Support for Programming Languages and Operating Systems (ASPLOS 2000); Nov. 2000; pp. 1-12.
Legg; Lightweight Directory Access Protocol (LDAP): Syntaxes and Matching Rules; IETF Network Working Group; RFC 4517; Jun. 2006; pp. 1-50.
Plank, T1: Erasure Codes for Storage Applications; FAST2005, 4th Usenix Conference on File Storage Technologies; Dec. 13-16, 2005; pp. 1-74.
Rabin; Efficient Dispersal of Information for Security, Load Balancing, and Fault Tolerance; Journal of the Association for Computer Machinery; vol. 36, No. 2; Apr. 1989; pp. 335-348.
Satran, et al.; Internet Small Computer Systems Interface (iSCSI); IETF Network Working Group; RFC 3720; Apr. 2004; pp. 1-257.
Sciberras; Lightweight Directory Access Protocol (LDAP): Schema for User Applications; IETF Network Working Group; RFC 4519; Jun. 2006; pp. 1-33.
Sermersheim; Lightweight Directory Access Protocol (LDAP): The Protocol; IETF Network Working Group; RFC 4511; Jun. 2006; pp. 1-68.
Shamir; How to Share a Secret; Communications of the ACM; vol. 22, No. 11; Nov. 1979; pp. 612-613.
Smith; Lightweight Directory Access Protocol (LDAP): Uniform Resource Locator; IETF Network Working Group; RFC 4516; Jun. 2006; pp. 1-15.
Smith; Lightweight Directory Access Protocol (LDAP): String Representation of Search Filters; IETF Network Working Group; RFC 4515; Jun. 2006; pp. 1-12.

(56) References Cited

OTHER PUBLICATIONS

Wildi; Java iSCSi Initiator; Master Thesis; Department of Computer and Information Science, University of Konstanz; Feb. 2007; 60 pgs.
Xin, et al.; Evaluation of Distributed Recovery in Large-Scale Storage Systems; 13th IEEE International Symposium on High Performance Distributed Computing; Jun. 2004; pp. 172-181.
Zeilenga; Lightweight Directory Access Protocol (LDAP): Directory Information Models; IETF Network Working Group; RFC 4512; Jun. 2006; pp. 1-49.
Zeilenga; Lightweight Directory Access Protocol (LDAP): Internationalized String Preparation; IETF Network Working Group; RFC 4518; Jun. 2006; pp. 1-14.
Zeilenga; Lightweight Directory Access Protocol (LDAP): String Representation of Distinguished Names; IETF Network Working Group; RFC 4514; Jun. 2006; pp. 1-15.
Zeilenga; Lightweight Directory Access Protocol (LDAP): Technical Specification Road Map; IETF Network Working Group; RFC 4510; Jun. 2006; pp. 1-8.

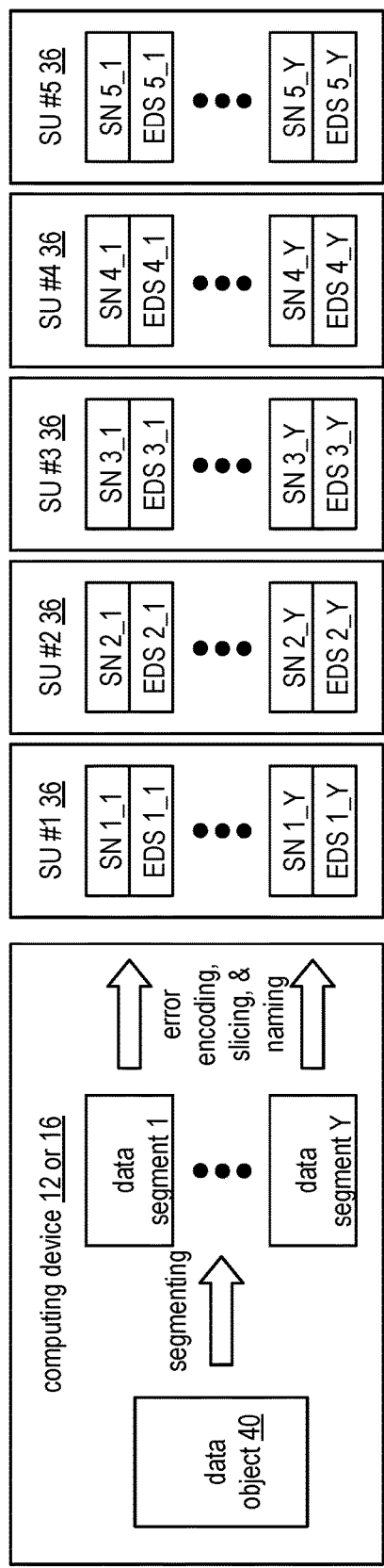
FIG. 3
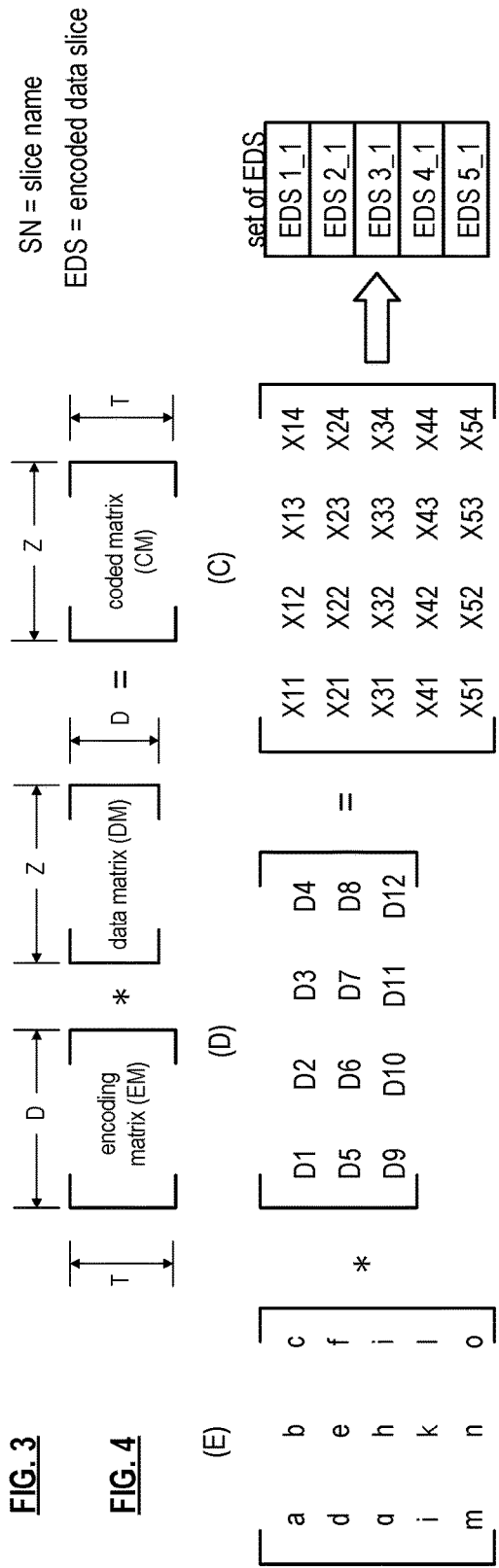
FIG. 4
FIG. 5
FIG. 6

STORAGE NETWORK FOR REBUILDING FAILED SLICES

CROSS-REFERENCE TO RELATED APPLICATIONS

The present U.S. Utility patent application claims priority pursuant to 35 U.S.C. § 120 as a continuation of U.S. Utility application Ser. No. 17/097,140, entitled "REBUILDING FAILED SLICES IN A VAST STORAGE NETWORK", filed Nov. 13, 2020, which is a continuation of U.S. Utility application Ser. No. 16/297,978, entitled "REBUILDING DATA IN A DISPERSED STORAGE NETWORK", filed Mar. 11, 2019, issued as U.S. Pat. No. 10,853,388 on Dec. 1, 2020, which is a continuation of U.S. Utility application Ser. No. 15/822,873, entitled "REBUILDING DATA IN A DISPERSED STORAGE NETWORK", filed Nov. 27, 2017, issued as U.S. Pat. No. 10,331,698 on Jun. 25, 2019, which is a continuation-in-part of U.S. Utility application Ser. No. 15/400,092, entitled "MODIFYING INFORMATION DISPERSAL ALGORITHM CONFIGURATIONS IN A DISPERSED STORAGE NETWORK", filed Jan. 6, 2017, issued as U.S. Pat. No. 10,057,351 on Aug. 21, 2018, which is a continuation-in-part of U.S. Utility application Ser. No. 15/223,707, entitled "AVOIDING WRITE CONFLICTS IN A DISPERSED STORAGE NETWORK", filed Jul. 29, 2016, issued as U.S. Pat. No. 10,013,471 on Jul. 3, 2018, which is a continuation of U.S. Utility application Ser. No. 13/959,702, entitled "WRITING DATA AVOIDING WRITE CONFLICTS IN A DISPERSED STORAGE NETWORK", filed Aug. 5, 2013, issued as U.S. Pat. No. 9,424,326 on Aug. 23, 2016, which claims priority pursuant to 35 U.S.C. § 119(e) to U.S. Provisional Application No. 61/700,691, entitled "UPDATING A DISPERSED STORAGE AND TASK NETWORK INDEX", filed Sep. 13, 2012, all of which are hereby incorporated herein by reference in their entirety and made part of the present U.S. Utility patent application for all purposes.

STATEMENT REGARDING FEDERALLY SPONSORED RESEARCH OR DEVELOPMENT

Not applicable.

INCORPORATION-BY-REFERENCE OF MATERIAL SUBMITTED ON A COMPACT DISC

Not applicable.

BACKGROUND OF THE INVENTION

Technical Field of the Invention

This invention relates generally to computer networks and more particularly to dispersing error encoded data.

Description of Related Art

Computing devices are known to communicate data, process data, and/or store data. Such computing devices range from wireless smart phones, laptops, tablets, personal computers (PC), work stations, and video game devices, to data centers that support millions of web searches, stock trades, or on-line purchases every day. In general, a computing device includes a central processing unit (CPU), a memory system, user input/output interfaces, peripheral device interfaces, and an interconnecting bus structure.

As is further known, a computer may effectively extend its CPU by using "cloud computing" to perform one or more computing functions (e.g., a service, an application, an algorithm, an arithmetic logic function, etc.) on behalf of the computer. Further, for large services, applications, and/or functions, cloud computing may be performed by multiple cloud computing resources in a distributed manner to improve the response time for completion of the service, application, and/or function. For example, Hadoop is an open source software framework that supports distributed applications enabling application execution by thousands of computers.

In addition to cloud computing, a computer may use "cloud storage" as part of its memory system. As is known, cloud storage enables a user, via its computer, to store files, applications, etc. on an Internet storage system. The Internet storage system may include a RAID (redundant array of independent disks) system and/or a dispersed storage system that uses an error correction scheme to encode data for storage.

BRIEF DESCRIPTION OF THE SEVERAL VIEWS OF THE DRAWING(S)

FIG. 3 is a schematic block diagram of an example of dispersed storage error encoding of data in accordance with the present invention;

FIG. 4 is a schematic block diagram of a generic example of an error encoding function in accordance with the present invention;

FIG. 5 is a schematic block diagram of a specific example of an error encoding function in accordance with the present invention;

FIG. 6 is a schematic block diagram of an example of a slice name of an encoded data slice (EDS) in accordance with the present invention;

DETAILED DESCRIPTION OF THE INVENTION

Figure 1:
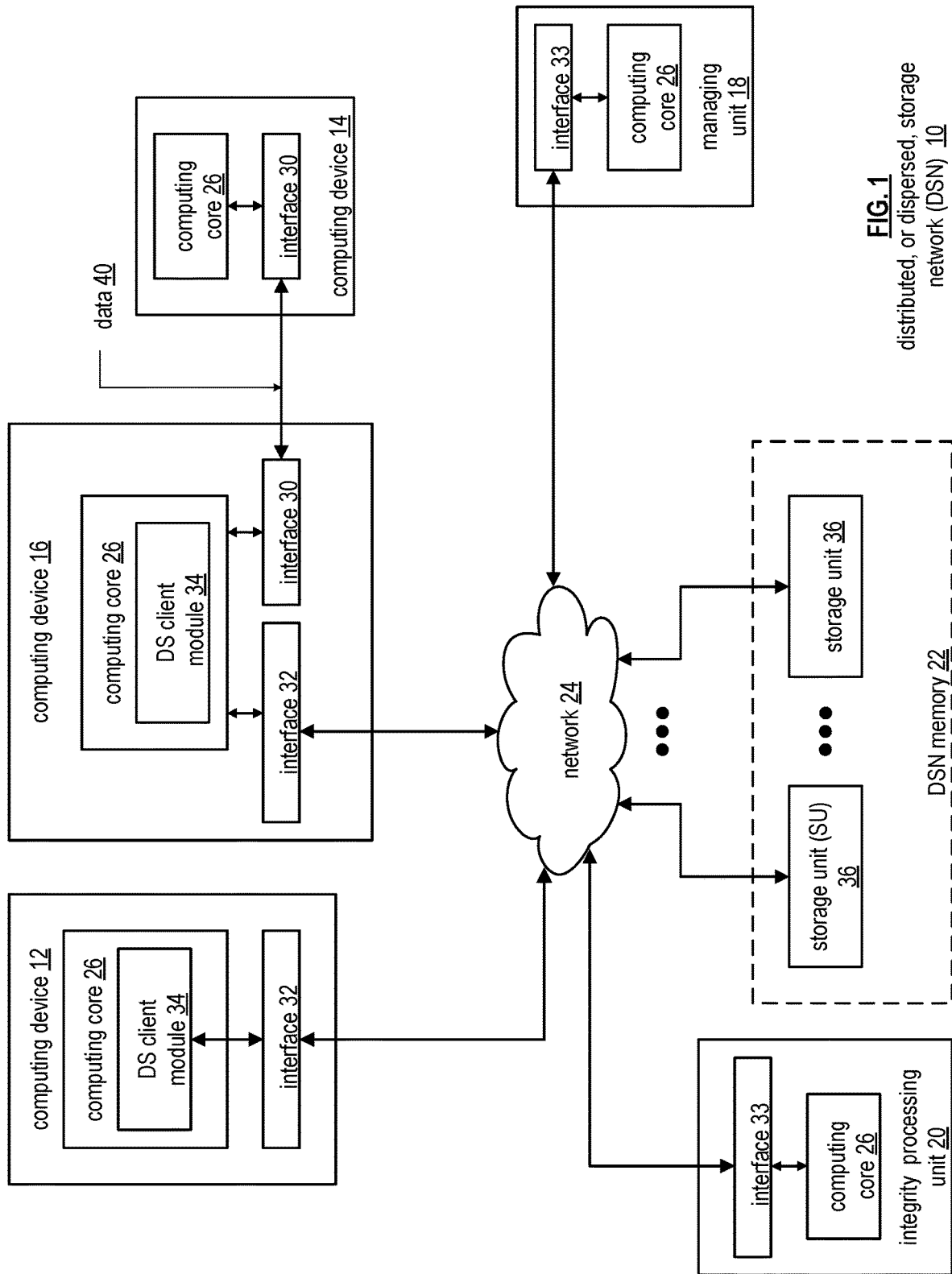
FIG. 1 is a schematic block diagram of an embodiment of a dispersed or distributed storage network (DSN) in accordance with the present invention.

FIG. 1 is a schematic block diagram of an embodiment of a dispersed, or distributed, storage network (DSN) 10 that includes a plurality of computing devices 12-16, a managing unit 18, an integrity processing unit 20, and a DSN memory 22. The components of the DSN 10 are coupled to a network 24, which may include one or more wireless and/or wire lined communication systems; one or more non-public intranet systems and/or public internet systems; and/or one or more local area networks (LAN) and/or wide area networks (WAN).

Figure 2:
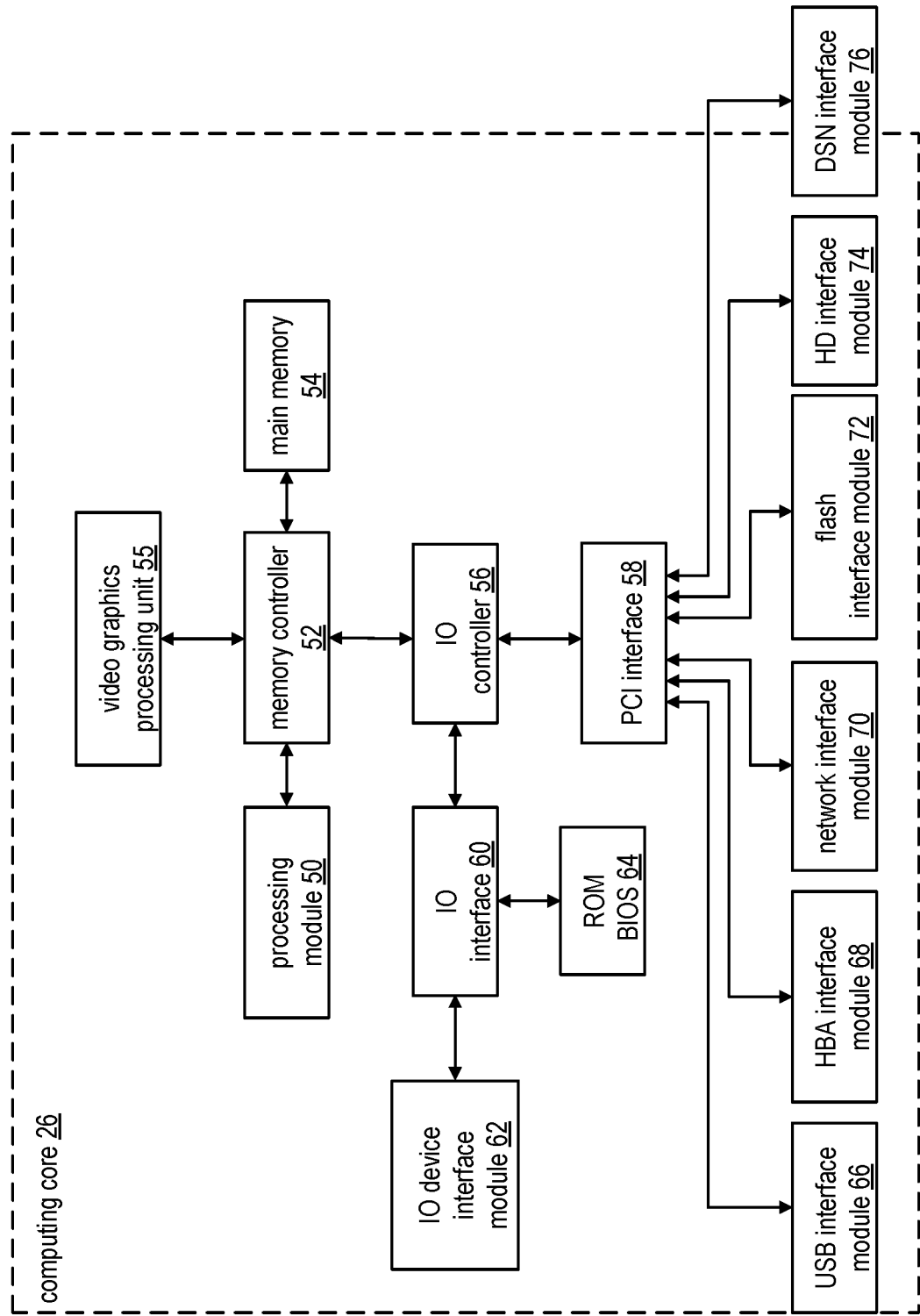
FIG. 2 is a schematic block diagram of an embodiment of a computing core in accordance with the present invention.

The DSN memory 22 includes a plurality of storage units 36 that may be located at geographically different sites (e.g., one in Chicago, one in Milwaukee, etc.), at a common site, or a combination thereof. For example, if the DSN memory 22 includes eight storage units 36, each storage unit is located at a different site. As another example, if the DSN memory 22 includes eight storage units 36, all eight storage units are located at the same site. As yet another example, if the DSN memory 22 includes eight storage units 36, a first pair of storage units are at a first common site, a second pair of storage units are at a second common site, a third pair of storage units are at a third common site, and a fourth pair of storage units are at a fourth common site. Note that a DSN memory 22 may include more or less than eight storage units 36. Further note that each storage unit 36 includes a computing core (as shown in FIG. 2, or components thereof) and a plurality of memory devices for storing dispersed error encoded data.

In various embodiments, each of the storage units operates as a distributed storage and task (DST) execution unit, and is operable to store dispersed error encoded data and/or to execute, in a distributed manner, one or more tasks on data. The tasks may be a simple function (e.g., a mathematical function, a logic function, an identify function, a find function, a search engine function, a replace function, etc.), a complex function (e.g., compression, human and/or computer language translation, text-to-voice conversion, voice-to-text conversion, etc.), multiple simple and/or complex functions, one or more algorithms, one or more applications, etc. Hereafter, a storage unit may be interchangeably referred to as a dispersed storage and task (DST) execution unit and a set of storage units may be interchangeably referred to as a set of DST execution units.

Each of the computing devices 12-16, the managing unit 18, and the integrity processing unit 20 include a computing core 26, which includes network interfaces 30-33. Computing devices 12-16 may each be a portable computing device and/or a fixed computing device. A portable computing device may be a social networking device, a gaming device, a cell phone, a smart phone, a digital assistant, a digital music player, a digital video player, a laptop computer, a handheld computer, a tablet, a video game controller, and/or any other portable device that includes a computing core. A fixed computing device may be a computer (PC), a computer server, a cable set-top box, a satellite receiver, a television set, a printer, a fax machine, home entertainment equipment, a video game console, and/or any type of home or office computing equipment. Note that each managing unit 18 and the integrity processing unit 20 may be separate computing devices, may be a common computing device, and/or may be integrated into one or more of the computing devices 12-16 and/or into one or more of the storage units 36. In various embodiments, computing devices 12-16 can include user devices and/or can be utilized by a requesting entity generating access requests, which can include requests to read or write data to storage units in the DSN.

Each interface 30, 32, and 33 includes software and hardware to support one or more communication links via the network 24 indirectly and/or directly. For example, interface 30 supports a communication link (e.g., wired, wireless, direct, via a LAN, via the network 24, etc.) between computing devices 14 and 16. As another example, interface 32 supports communication links (e.g., a wired connection, a wireless connection, a LAN connection, and/or any other type of connection to/from the network 24) between computing devices 12 & 16 and the DSN memory 22. As yet another example, interface 33 supports a communication link for each of the managing unit 18 and the integrity processing unit 20 to the network 24.

Computing devices 12 and 16 include a dispersed storage (DS) client module 34, which enables the computing device to dispersed storage error encode and decode data as subsequently described with reference to one or more of FIGS. 3-8. In this example embodiment, computing device 16 functions as a dispersed storage processing agent for computing device 14. In this role, computing device 16 dispersed storage error encodes and decodes data on behalf of computing device 14. With the use of dispersed storage error encoding and decoding, the DSN 10 is tolerant of a significant number of storage unit failures (the number of failures is based on parameters of the dispersed storage error encoding function) without loss of data and without the need for a redundant or backup copies of the data. Further, the DSN 10 stores data for an indefinite period of time without data loss and in a secure manner (e.g., the system is very resistant to unauthorized attempts at accessing the data).

In operation, the managing unit 18 performs DS management services. For example, the managing unit 18 establishes distributed data storage parameters (e.g., vault creation, distributed storage parameters, security parameters, billing information, user profile information, etc.) for computing devices 12-14 individually or as part of a group of user devices. As a specific example, the managing unit 18 coordinates creation of a vault (e.g., a virtual memory block associated with a portion of an overall namespace of the DSN) within the DSN memory 22 for a user device, a group of devices, or for public access and establishes per vault dispersed storage (DS) error encoding parameters for a vault. The managing unit 18 facilitates storage of DS error encoding parameters for each vault by updating registry information of the DSN 10, where the registry information may be stored in the DSN memory 22, a computing device 12-16, the managing unit 18, and/or the integrity processing unit 20.

The DSN managing unit 18 creates and stores user profile information (e.g., an access control list (ACL)) in local memory and/or within memory of the DSN memory 22. The user profile information includes authentication information, permissions, and/or the security parameters. The security parameters may include encryption/decryption scheme, one or more encryption keys, key generation scheme, and/or data encoding/decoding scheme.

The DSN managing unit 18 creates billing information for a particular user, a user group, a vault access, public vault access, etc. For instance, the DSN managing unit 18 tracks the number of times a user accesses a non-public vault and/or public vaults, which can be used to generate a per-access billing information. In another instance, the DSN managing unit 18 tracks the amount of data stored and/or retrieved by a user device and/or a user group, which can be used to generate a per-data-amount billing information.

As another example, the managing unit 18 performs network operations, network administration, and/or network maintenance. Network operations includes authenticating user data allocation requests (e.g., read and/or write requests), managing creation of vaults, establishing authentication credentials for user devices, adding/deleting components (e.g., user devices, storage units, and/or computing devices with a DS client module 34) to/from the DSN 10, and/or establishing authentication credentials for the storage units 36. Network administration includes monitoring devices and/or units for failures, maintaining vault information, determining device and/or unit activation status, determining device and/or unit loading, and/or determining any other system level operation that affects the performance level of the DSN 10. Network maintenance includes facilitating replacing, upgrading, repairing, and/or expanding a device and/or unit of the DSN 10.

The integrity processing unit 20 performs rebuilding of 'bad' or missing encoded data slices. At a high level, the integrity processing unit 20 performs rebuilding by periodically attempting to retrieve/list encoded data slices, and/or slice names of the encoded data slices, from the DSN memory 22. For retrieved encoded slices, they are checked for errors due to data corruption, outdated version, etc. If a slice includes an error, it is flagged as a 'bad' slice. For encoded data slices that were not received and/or not listed, they are flagged as missing slices. Bad and/or missing slices are subsequently rebuilt using other retrieved encoded data slices that are deemed to be good slices to produce rebuilt slices. The rebuilt slices are stored in the DSN memory 22.

FIG. 2 is a schematic block diagram of an embodiment of a computing core 26 that includes a processing module 50, a memory controller 52, main memory 54, a video graphics processing unit 55, an input/output (IO) controller 56, a peripheral component interconnect (PCI) interface 58, an 10 interface module 60, at least one IO device interface module 62, a read only memory (ROM) basic input output system (BIOS) 64, and one or more memory interface modules. The one or more memory interface module(s) includes one or more of a universal serial bus (USB) interface module 66, a host bus adapter (HBA) interface module 68, a network interface module 70, a flash interface module 72, a hard drive interface module 74, and a DSN interface module 76.

The DSN interface module 76 functions to mimic a conventional operating system (OS) file system interface (e.g., network file system (NFS), flash file system (FFS), disk file system (DFS), file transfer protocol (FTP), web-based distributed authoring and versioning (WebDAV), etc.) and/or a block memory interface (e.g., small computer system interface (SCSI), internet small computer system interface (iSCSI), etc.). The DSN interface module 76 and/or the network interface module 70 may function as one or more of the interface 30-33 of FIG. 1. Note that the IO device interface module 62 and/or the memory interface modules 66-76 may be collectively or individually referred to as IO ports.

FIG. 3 is a schematic block diagram of an example of dispersed storage error encoding of data. When a computing device 12 or 16 has data to store it disperse storage error encodes the data in accordance with a dispersed storage error encoding process based on dispersed storage error encoding parameters. Here, the computing device stores data object 40, which can include a file (e.g., text, video, audio, etc.), or other data arrangement. The dispersed storage error encoding parameters include an encoding function (e.g., information dispersal algorithm (IDA), Reed-Solomon, Cauchy Reed-Solomon, systematic encoding, non-systematic encoding, on-line codes, etc.), a data segmenting protocol (e.g., data segment size, fixed, variable, etc.), and per data segment encoding values. The per data segment encoding values include a total, or pillar width, number (T) of encoded data slices per encoding of a data segment i.e., in a set of encoded data slices); a decode threshold number (D) of encoded data slices of a set of encoded data slices that are needed to recover the data segment; a read threshold number (R) of encoded data slices to indicate a number of encoded data slices per set to be read from storage for decoding of the data segment; and/or a write threshold number (W) to indicate a number of encoded data slices per set that must be accurately stored before the encoded data segment is deemed to have been properly stored. The dispersed storage error encoding parameters may further include slicing information (e.g., the number of encoded data slices that will be created for each data segment) and/or slice security information (e.g., per encoded data slice encryption, compression, integrity checksum, etc.).

In the present example, Cauchy Reed-Solomon has been selected as the encoding function (a generic example is shown in FIG. 4 and a specific example is shown in FIG. 5); the data segmenting protocol is to divide the data object into fixed sized data segments; and the per data segment encoding values include: a pillar width of 5, a decode threshold of 3, a read threshold of 4, and a write threshold of 4. In accordance with the data segmenting protocol, the computing device 12 or 16 divides data object 40 into a plurality of fixed sized data segments (e.g., 1 through Y of a fixed size in range of Kilo-bytes to Tera-bytes or more). The number of data segments created is dependent of the size of the data and the data segmenting protocol.

The computing device 12 or 16 then disperse storage error encodes a data segment using the selected encoding function (e.g., Cauchy Reed-Solomon) to produce a set of encoded data slices. FIG. 4 illustrates a generic Cauchy Reed-Solomon encoding function, which includes an encoding matrix (EM), a data matrix (DM), and a coded matrix (CM). The size of the encoding matrix (EM) is dependent on the pillar width number (T) and the decode threshold number (D) of selected per data segment encoding values. To produce the data matrix (DM), the data segment is divided into a plurality of data blocks and the data blocks are arranged into D number of rows with Z data blocks per row. Note that Z is a function of the number of data blocks created from the data segment and the decode threshold number (D). The coded matrix is produced by matrix multiplying the data matrix by the encoding matrix.

FIG. 5 illustrates a specific example of Cauchy Reed-Solomon encoding with a pillar number (T) of five and decode threshold number of three. In this example, a first data segment is divided into twelve data blocks (D1-D12). The coded matrix includes five rows of coded data blocks, where the first row of X11-X14 corresponds to a first encoded data slice (EDS 1_1), the second row of X21-X24 corresponds to a second encoded data slice (EDS 2_1), the third row of X31-X34 corresponds to a third encoded data slice (EDS 3_1), the fourth row of X41-X44 corresponds to a fourth encoded data slice (EDS 4_1), and the fifth row of X51-X54 corresponds to a fifth encoded data slice (EDS 5_1). Note that the second number of the EDS designation corresponds to the data segment number.

Returning to the discussion of FIG. 3, the computing device also creates a slice name (SN) for each encoded data slice (EDS) in the set of encoded data slices. A typical format for a slice name 80 is shown in FIG. 6. As shown, the slice name (SN) 80 includes a pillar number of the encoded data slice (e.g., one of 1-T), a data segment number (e.g., one of 1-Y), a vault identifier (ID), a data object identifier (ID), and may further include revision level information of the encoded data slices. The slice name functions as, at least part of, a DSN address for the encoded data slice for storage and retrieval from the DSN memory 22.

As a result of encoding, the computing device 12 or 16 produces a plurality of sets of encoded data slices, which are provided with their respective slice names to the storage units for storage. As shown, the first set of encoded data slices includes EDS 1_1 through EDS 5_1 and the first set of slice names includes SN 1_1 through SN 5_1 and the last set of encoded data slices includes EDS 1_Y through EDS 5_Y and the last set of slice names includes SN 1_Y through SN 5_Y.

Figures 7, 8:
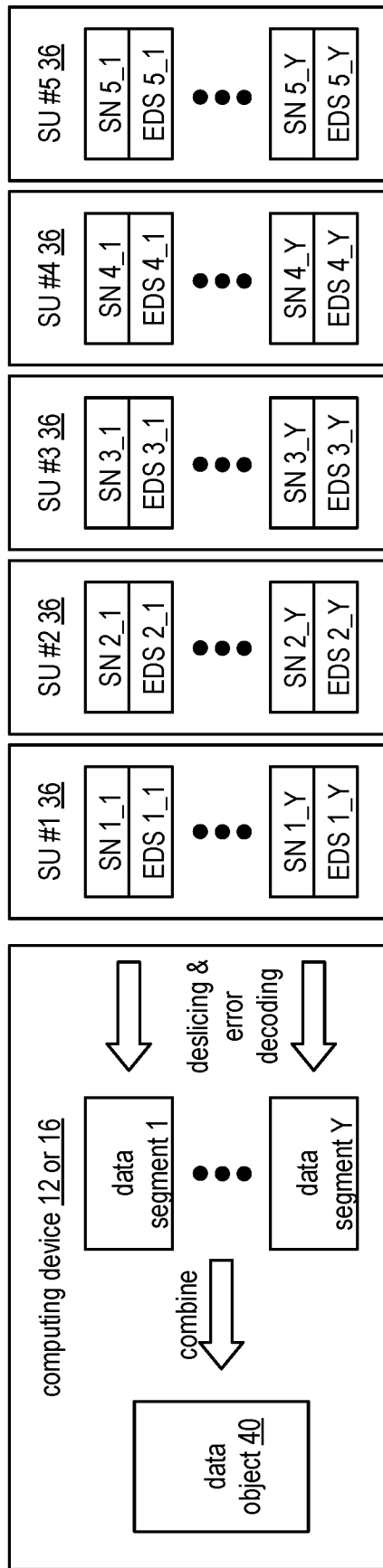
FIG. 7 is a schematic block diagram of an example of dispersed storage error decoding of data in accordance with the present invention.
FIG. 8 is a schematic block diagram of a generic example of an error decoding function in accordance with the present invention.

FIG. 7 is a schematic block diagram of an example of dispersed storage error decoding of a data object that was dispersed storage error encoded and stored in the example of FIG. 4. In this example, the computing device 12 or 16 retrieves from the storage units at least the decode threshold number of encoded data slices per data segment. As a specific example, the computing device retrieves a read threshold number of encoded data slices.

To recover a data segment from a decode threshold number of encoded data slices, the computing device uses a decoding function as shown in FIG. 8. As shown, the decoding function is essentially an inverse of the encoding function of FIG. 4. The coded matrix includes a decode threshold number of rows (e.g., three in this example) and the decoding matrix in an inversion of the encoding matrix that includes the corresponding rows of the coded matrix. For example, if the coded matrix includes rows 1, 2, and 4, the encoding matrix is reduced to rows 1, 2, and 4, and then inverted to produce the decoding matrix.

Figure 9:
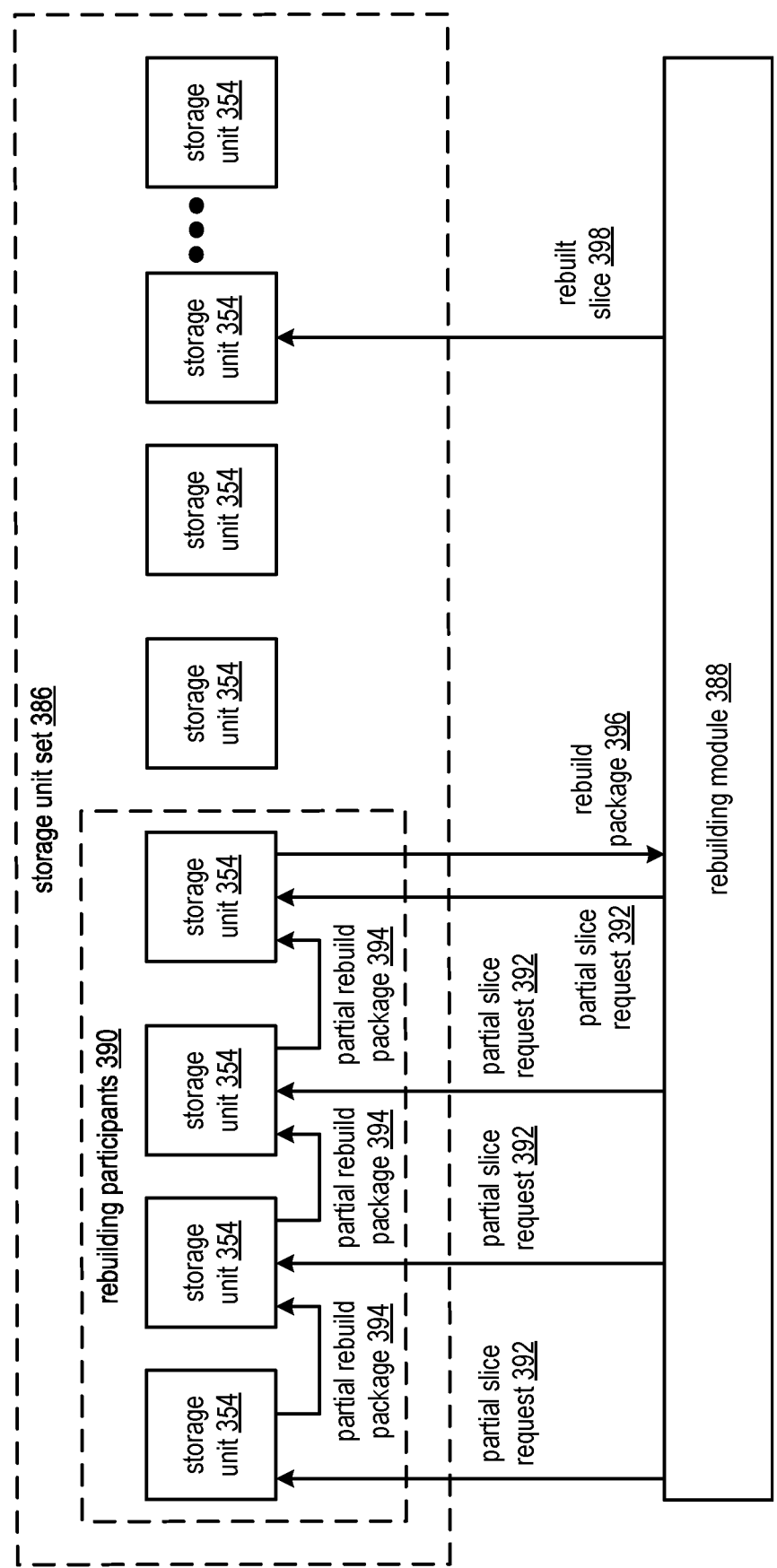
FIG. 9 is a schematic block diagram of an embodiment of a dispersed or distributed storage network (DSN) in accordance with the present invention.

FIG. 9 is a schematic block diagram of another embodiment of a dispersed storage network (DSN) system that includes a storage unit set 386 and a rebuilding module 388. The rebuilding module 388 can include at least one processor and/or a memory, and can be implemented using one or more of a computing device, a server, a user device, the storage integrity unit 20 FIG. 1, a storage integrity module, a dispersed storage (DS) processing unit, a DS processing module, a DS unit, a distributed storage and task (DST) processing module, the DS client module 34 of FIG. 1, the computing device 16 of FIG. 1, and/or the storage unit 36 of FIG. 1. The storage unit set 386 includes a set of storage units 354 that are utilized to store one or more sets of encoded data slices, where a data segment is encoded using a dispersed storage error coding function to produce the one or more sets of encoded data slices. Some or all of the set of storage units can be implemented by utilizing the storage unit 36 of FIG. 1.

The system can function to remedy a storage error (e.g., missing encoded data slice, corrupted encoded data slice) associated with an encoded data slice stored within a storage unit 354 of the set of storage units. The rebuilding module 388 detects the storage error of the encoded data slice of a corresponding set of encoded data slices associated with the storage unit of the set of storage units. The detecting includes at least one of a scanning for storage errors, receiving an error message, and receiving a rebuilding request. The rebuilding module 388 selects a decode threshold number of storage units as rebuilding participants 390. The selecting includes identifying available storage units 354 of the set of storage units and selecting from the available storage units those storage units associated with other encoded data slices of the set of encoded data slices, where the other encoded data slices are not associated with storage errors.

The rebuilding module 388 issues partial slice requests 392 to each storage unit of the rebuilding participants 390, where each partial slice request 392 includes one or more of an identifier of the encoded data slice associated with the storage error, identifiers of the rebuilding participants, a rebuilding matrix, an encoding matrix, a public key of a public/private key pair of the rebuilding module, and a partial rebuild package routing ordering (e.g., including a destination for sending a partial rebuild package).

A rebuilding participant (e.g., hereafter interchangeably referred to as a storage unit 354), of the rebuilding participants 390, generates a zero information gain partial slice. The generating the zero information gain partial slice includes obtaining an encoding matrix utilized to generate the encoded data slice (e.g., extract from a received partial slice request, retrieve from a memory), reducing the encoding matrix to produce a square matrix that exclusively includes rows identified in the partial slice request (e.g., include a decode threshold number of rows associated with the rebuilding participants), inverting the square matrix to produce an inverted matrix (e.g., alternatively, may extract the rebuilding matrix from the partial slice request as the inverted matrix), matrix multiplying the inverted matrix by an associated encoded data slice held by the rebuilding participant (e.g., of the other encoded data slices of the set of encoded data slices) to produce a vector, and matrix multiplying the vector by a row of the encoding matrix corresponding to the encoded data slice to be rebuilt (e.g., alternatively, may extract the row from the partial slice request), to produce the zero information gain partial slice.

The rebuilding participant encrypts the zero information gain partial slice using the public key of the rebuilding module and a homomorphic encryption algorithm to produce an encrypted zero information gain partial slice. Homomorphic encryption enables operations to be performed on ciphertexts, which remain intact upon decryption. For example, if A and B are two plaintext numbers, an "additively" homomorphic encryption system is one in which Decryption(Encryption(A)+Encryption(B))=A+B.

Examples include the Paillier cryptosystem and the Goldwasser-Micali cryptosystem. Thus, two encrypted ciphertexts can be added and when decrypted with the appropriate key, the result is the same as if plaintexts A and B had been added.

The rebuilding participants and/or the rebuilding module combines a corresponding encrypted zero information gain partial slice from each of the rebuilding participants to produce a partial rebuild package 394. The combining includes one or more of combining a received partial rebuild package 394 from another rebuilding participant with the encrypted zero information gain partial slice to produce another partial rebuild package and sending the other partial rebuild package 394 to yet another rebuilding participant in accordance with the partial rebuild package routing ordering. For example, a second storage unit of the rebuilding participants receives a partial rebuild package 394 from a first storage unit 354 of the rebuilding participants 390, combines the received partial rebuild package from the first storage unit with its own encrypted zero information gain partial slice to produce the other partial rebuild package 394 to send to a third storage unit 354 of the rebuilding participants 390.

The combining of the received partial rebuild package 394 from the other rebuilding participant with the encrypted zero information gain partial slice includes finding the sum of the partials in the field. For example, the received partial rebuild package is exclusiveOR-ed with the encrypted zero information gain partial. Depending on the field, summing may be exclusiveOR (XOR) or it may be another form of addition (e.g., such as addition modulo a prime). For example, some implementations of Shamir secret sharing, for example, perform all addition and multiplication modulo some prime. In such a case, instead of using XOR the summing may be accomplished by combining the partials via modular addition (e.g., which is how addition is defined in that field of integers). Such an approach may require a minor change to how the encryption of the partials works. Instead of combining the partial with a keystream via XOR, one rebuilding participant would add the key stream (e.g., according to rules of addition in the field) such that another rebuilding participant using a corresponding key would subtract the same keystream from a partial associated with the other rebuilding participant. In fields where XOR represents addition, it also represents subtraction, so all participants handle combining identically. In an alternate field of integers where addition was not identical to subtraction, then rebuilding participants must agree on a convention where a first rebuilding participant subtracts and a second rebuilding participant adds. For example, the convention may include a deterministic approach where whichever rebuilding participant has a lower index number for the encoded data slice/share they hold adds and another rebuilding participant associated with a higher index number subtracts.

A last storage unit 354 of the rebuilding participants 390 generates an output and associated partial rebuild package 394 as a rebuild package 396 to the rebuilding module 388, where the rebuild package 396 includes a combination of each of a decode threshold number of encrypted zero information gain partial slices from each of the rebuilding participants. The rebuilding module 388 decrypts the rebuild package 396 using a private key of the public/private key pair of the rebuilding module 388 to produce a rebuilt slice 398. The rebuilding module 388 facilitates storage of the rebuilt slice 398 in the storage unit 354 associated with the storage error. For example, the rebuilding module 388 sends the rebuilt slice 398 to a seventh storage unit 354 for storage.

To rebuild data, a rebuilding module can scan for slices to rebuild by comparing responses to listing requests from storage units. If a particular revision of a slice is found on less than a full width of storage units or stores of a DSN module, the rebuilding module can then determine what information dispersal algorithm (IDA) configuration was used for that slice to determine if the source is recoverable or not. This determination can be made by reading at least one of the slices and/or by checking its IDA identifier which is represented in the slice data. Based on the IDA identifier, the rebuilding module can determine what the IDA threshold is, can retrieve at least a threshold number of slices, and can decode the slices to obtain the source data. If the width of the IDA configuration is the maximum, the rebuilding module can rebuild the slices and keep the revision the same. If, however, the width is less than the maximum width, the rebuilder can rebuild all slices, for example, by choosing a new revision number, and can use the IDA configuration having the greatest width. At this point the rebuilding module can finalize the slices, for example, by removing the previous revisions of slices.

In various embodiments, a processing system a rebuilding module includes at least one processor and a memory that stores operational instructions, that when executed by the at least one processor cause the processing system to detect that less than a pillar width number of encoded data slices of a set of encoded data slices of a common revision are retrievable from a set of storage units. Dispersal parameters associated with the set of encoded data slices are identified, where the dispersal parameters include a decode threshold number. The decode threshold number of encoded data slices are retrieved when the less than the pillar width number of encoded data slices includes at least the decode threshold number of encoded data slices. The decode threshold number of encoded data slices are decoded to reproduce a data segment. The processing system determines whether to rebuild at least one encoded data slice based on determining whether combining the at least one encoded data slice with the less than the pillar width number of encoded data slices reforms a full pillar width number of encoded data slices. The data segment is encoded to produce the at least one encoded data slice and storage of the at least one encoded data slice in the set of storage units is facilitated in accordance with the common revision when it is determined to rebuild the at least one encoded data slice. The data segment is encoded to reproduce the set of encoded data slices and storage of the reproduced set of encoded data slices is facilitated in the set of storage units in accordance with a new revision when it is determined to not rebuild the at least one encoded data slice.

In various embodiments, the data segment was dispersed storage error encoded to produce the set of encoded data slices for storage in the set of storage units. In various embodiments, detecting that less than the pillar width number of encoded data slices are retrievable includes invoking a list query to the set of storage units and comparing query responses received from the set of storage units. In various embodiments, identifying the dispersal parameters includes reading an encoded data slice of the set of encoded data slices and extracting the dispersal parameters from the encoded data slice. In various embodiments, retrieving the decode number of encoded data slices includes generating at least the decode threshold number of read slice requests for transmission to the set of storage units, and receiving the at least the decode threshold number of encoded data slices from the set of storage units in response.

In various embodiments, determining whether to rebuild the at least one encoded data slice is further based on the dispersal parameters and a reliability goal. In various embodiments, the reliability goal indicates to provide the full pillar width of encoded data slices, where the at least one encoded data slice is determined to be rebuilt in response to determining that a dispersal parameter pillar width is less than the full pillar width.

In various embodiments, facilitating storage of the at least one encoded data slice includes, for each slice of the at least one encoded data slice, generating a write slice request that includes the encoded data slice and a revision number of the common revision. In various embodiments, facilitating storage of the reproduced set of encoded data slices includes generating a set of write slice requests that includes the set of encoded data slices and a new revision number.

Figure 10:
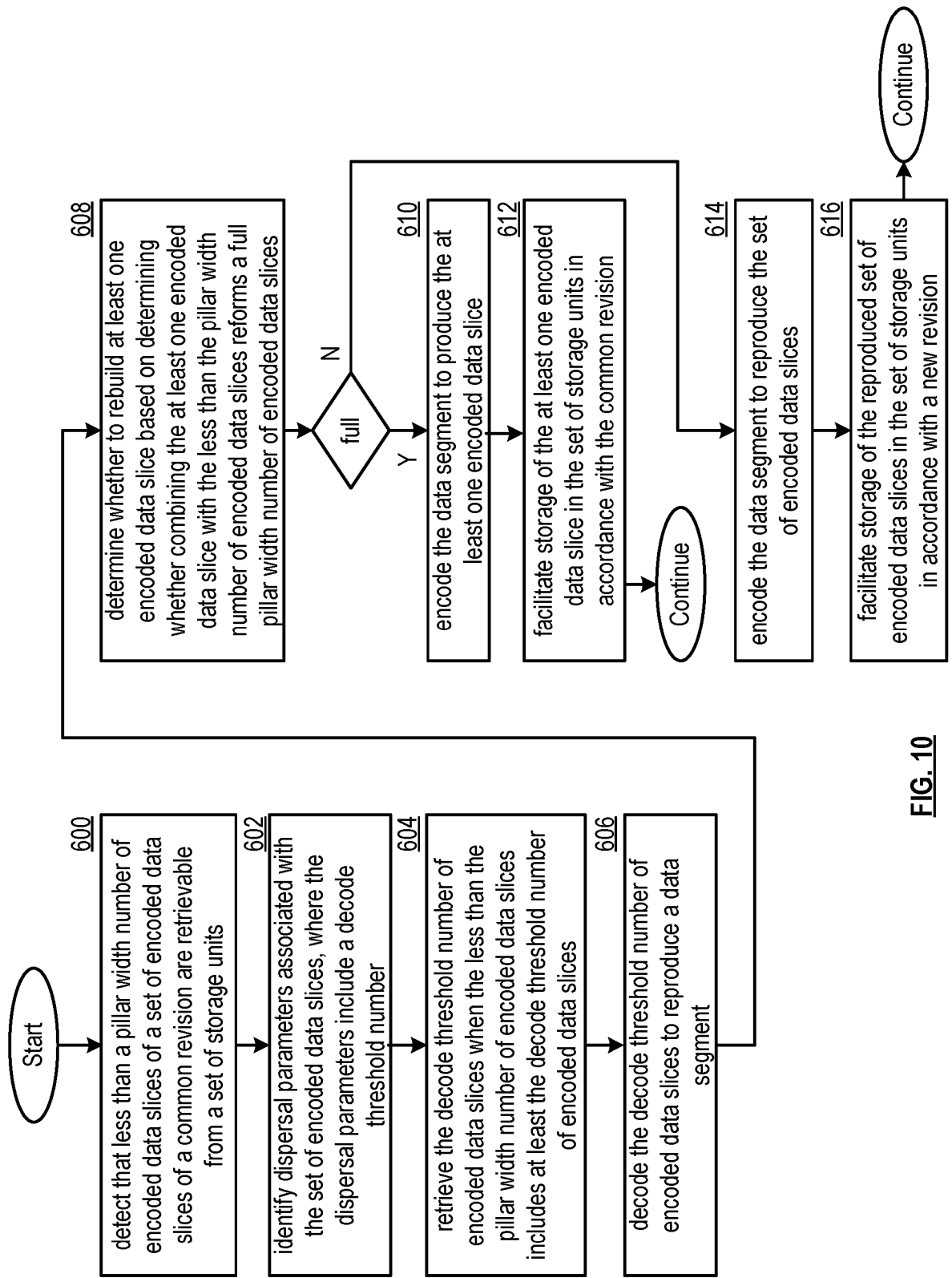
FIG. 10 is a logic diagram of an example of a method of rebuilding data in accordance with the present invention.

FIG. 10 is a flowchart illustrating an example of rebuilding data. In particular, a method is presented for use in association with one or more functions and features described in conjunction with FIGS. 1-9, for execution by a processing system of a rebuilding module that includes a processor and memory, by a distributed storage and task (DS) client module of a computing device that includes a processor, and/or via another processing system of a dispersed storage network that includes at least one processor and memory that stores instruction that configure the processor or processors to perform the steps described below.

The method begins at step 600 where a processing system (e.g., of a distributed storage and task (DS) client module) detects that less than a pillar width number of encoded data slices of a set of encoded data slices of a common revision are retrievable from a distributed storage and task network (DSTN) module, a set of storage units such as storage unit set 386 of FIG. 9, and/or another module that includes a memory that stores encoded data slices. The detecting can include at least one of receiving a message, invoking a list query, and/or comparing query responses. The method continues at step 602 where the processing system identifies dispersal parameters associated with a set of encoded data slices. The identifying can include at least one of performing a registry lookup, reading at least one encoded data slice of the set of encoded data slices, and/or extracting the dispersal parameters from the at least one encoded data slice. The identified dispersal parameters can include a decode threshold number.

When the less then the pillar width number of encoded data slices includes at least a decode threshold number of encoded data slices, the method continues at step 604 where the processing system retrieves the at least the decode threshold number of encoded data slices. The retrieving can include generating at least a decode threshold number of read slice requests for any available decode threshold number of encoded data slices of the set of encoded data slices, outputting the at least the decode threshold number of reads slice requests to the DSTN module and/or the set of storage units, and/or receiving the least the decode threshold number of encoded data slices.

The method continues at step 606 where the processing system decodes the decode threshold number of encoded data slices using a dispersed storage error coding function in accordance with the dispersal parameters to reproduce a data segment. The method continues at step 608 where the processing system determines whether to rebuild one or more encoded data slices based on determining whether combining the one or more encoded data slices with the less than the pillar width number of encoded data slices reforms a full pillar width number of encoded data slices. The determining can be based on one or more of the dispersal parameters, a memory availability indicator, a reliability goal, a performance goal, a request, a lookup, and/or a predetermination. For example, the processing system determines to rebuild the one or more encoded data slices when a reliability goal indicates to always provide a full pillar width number of encoded data slices. The method branches to step 614 when the processing system determines not to rebuild the one or more encoded data slices. The method continues to step 610 when the processing system determines to rebuild the one or more encoded data slices.

The method continues at step 610 where the processing system encodes the data segment using the dispersed storage error coding function in accordance with the dispersal parameters to produce the one or more encoded data slices. The method continues at step 612 where the processing system facilitates storing the one or more encoded data slices in the DSTN module associated with the common revision and/or the set of storage units in accordance with the common revision. The facilitating can include, for each slice of the one or more encoded data slices, generating a write slice request that includes the encoded data slice and/or a revision number of the common revision.

The method continues at step 614 where the processing system encodes the data segment using the dispersed storage or coding function in accordance with the dispersal parameters to reproduce the set of encoded data slices (e.g., full pillar width set) when the processing system determines not to rebuild the one or more encoded data slices. The method continues at step 616 where the processing system facilitates storing the reproduced set of encoded data slices in the DSTN module associated with a new revision and/or the set of storage units in accordance with the new revision. The facilitating can include generating a set of write slice requests that includes the set of encoded data slices and/or a new revision number.

In various embodiments, a non-transitory computer readable storage medium includes at least one memory section that stores operational instructions that, when executed by a processing system of a dispersed storage network (DSN) that includes a processor and a memory, causes the processing system to detect that less than a pillar width number of encoded data slices of a set of encoded data slices of a common revision are retrievable from a set of storage units. Dispersal parameters associated with the set of encoded data slices are identified, where the dispersal parameters include a decode threshold number. The decode threshold number of encoded data slices are retrieved when the less than the pillar width number of encoded data slices includes at least the decode threshold number of encoded data slices. The decode threshold number of encoded data slices are decoded to reproduce a data segment. The processing system determines whether to rebuild at least one encoded data slice based on determining whether combining the at least one encoded data slice with the less than the pillar width number of encoded data slices reforms a full pillar width number of encoded data slices. The data segment is encoded to produce the at least one encoded data slice and storage of the at least one encoded data slice in the set of storage units is facilitated in accordance with the common revision when it is determined to rebuild the at least one encoded data slice. The data segment is encoded to reproduce the set of encoded data slices and storage of the reproduced set of encoded data slices is facilitated in the set of storage units in accordance with a new revision when it is determined to not rebuild the at least one encoded data slice.

It is noted that terminologies as may be used herein such as bit stream, stream, signal sequence, etc. (or their equivalents) have been used interchangeably to describe digital information whose content corresponds to any of a number of desired types (e.g., data, video, speech, audio, etc. any of which may generally be referred to as 'data').

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "configured to", "operably coupled to", "coupled to", and/or "coupling" includes direct coupling between items and/or indirect coupling between items via an intervening item (e.g., an item includes, but is not limited to, a component, an element, a circuit, and/or a module) where, for an example of indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "configured to", "operable to", "coupled to", or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item.

As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1. As may be used herein, the term "compares unfavorably", indicates that a comparison between two or more items, signals, etc., fails to provide the desired relationship.

As may also be used herein, the terms "processing system", "processing module", "processing circuit", "processor", and/or "processing unit" may be used interchangeably, and may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing system, processing module, module, processing circuit, and/or processing unit may be, or further include, memory and/or an integrated memory element, which may be a single memory device, a plurality of memory devices, and/or embedded circuitry of another processing system, processing module, module, processing circuit, and/or processing unit. Such a memory device may be a read-only memory, random access memory, volatile memory, non-volatile memory, static memory, dynamic memory, flash memory, cache memory, and/or any device that stores digital information. Note that if the processing system, processing module, module, processing circuit, and/ or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing system, processing module, module, processing circuit, and/ or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing system, processing module, module, processing circuit, and/or processing unit executes, hard coded and/or operational instructions corresponding to at least some of the steps and/or functions illustrated in one or more of the Figures. Such a memory device or memory element can be included in an article of manufacture.

One or more embodiments have been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claims. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality.

To the extent used, the flow diagram block boundaries and sequence could have been defined otherwise and still perform the certain significant functionality. Such alternate definitions of both functional building blocks and flow diagram blocks and sequences are thus within the scope and spirit of the claims. One of average skill in the art will also recognize that the functional building blocks, and other illustrative blocks, modules and components herein, can be implemented as illustrated or by discrete components, application specific integrated circuits, processors executing appropriate software and the like or any combination thereof.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

The one or more embodiments are used herein to illustrate one or more aspects, one or more features, one or more concepts, and/or one or more examples. A physical embodiment of an apparatus, an article of manufacture, a machine, and/or of a process may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/ or indirect coupling between other elements as recognized by one of average skill in the art.

The term "module" is used in the description of one or more of the embodiments. A module implements one or more functions via a device such as a processor or other processing device or other hardware that may include or operate in association with a memory that stores operational instructions. A module may operate independently and/or in conjunction with software and/or firmware. As also used herein, a module may contain one or more sub-modules, each of which may be one or more modules.

As may further be used herein, a computer readable memory includes one or more memory elements. A memory element may be a separate memory device, multiple memory devices, or a set of memory locations within a memory device. Such a memory device may be a read-only memory, random access memory, volatile memory, non-volatile memory, static memory, dynamic memory, flash memory, cache memory, and/or any device that stores digital information. The memory device may be in a form a solid state memory, a hard drive memory, cloud memory, thumb drive, server memory, computing device memory, and/or other physical medium for storing digital information.

While particular combinations of various functions and features of the one or more embodiments have been expressly described herein, other combinations of these features and functions are likewise possible. The present disclosure is not limited by the particular examples disclosed herein and expressly incorporates these other combinations.

What is claimed is:

1. A method for execution by a processor of a storage network, the method comprises:
    encoding, via a dispersed error encoding, at least one data object as a write threshold number of encoded data slices;
    storing the write threshold number of the encoded data slices in a set of storage units of the storage network;
    determining when, due to a failure of at least one of the set of storage units, less than a pillar width number of the encoded data slices of a common revision are retrievable from the set of storage units:
        retrieving a decode threshold number of the encoded data slices from others of the set of storage units;
        decoding the decode threshold number of the encoded data slices to reproduce the at least one data object;
        restoring availability of the pillar width number of the encoded data slices of the common revision by:
            rebuilding at least a subset of encoded data slices of the set of encoded data slices, based on an encoding of the at least one data object; and
            storing the at least a subset of encoded data slices in the storage network.

2. The method of claim 1, wherein determining when less than the pillar width number of encoded data slices are available includes invoking a list query to the set of storage units and comparing query responses received from the set of storage units.

3. The method of claim 1, wherein retrieving the decode threshold number of encoded data slices includes generating at least the decode threshold number of read slice requests for transmission to the set of storage units, and receiving the at least the decode threshold number of encoded data slices from the set of storage units in response.

4. The method of claim 1, wherein determining when less than the pillar width number of encoded data slices are available includes determining when less than the pillar width number of the set of encoded data slices of a common revision are retrievable from the set of storage units.

5. The method of claim 4, further comprising:
    identifying dispersal parameters associated with the set of encoded data slices, wherein the dispersal parameters include the decode threshold number.

6. The method of claim 5, wherein identifying the dispersal parameters includes reading an encoded data slice of the set of encoded data slices and extracting the dispersal parameters from the encoded data slice.

7. The method of claim 6, wherein retrieving the decode threshold number of encoded data slices is performed when the less than the pillar width number includes at least the decode threshold number of encoded data slices.

8. The method of claim 7, further comprising:
    determining whether to rebuild the subset of encoded data slices of the set of encoded data slices based on determining whether combining the at least one encoded data slice with the less than the pillar width number of encoded data slices reforms a full pillar width number of encoded data slices.

9. The method of claim 8, further comprising:
    encoding the at least one data object to reproduce the set of encoded data slices and facilitating storage of the reproduced set of encoded data slices in the set of storage units in accordance with a new revision when it is determined to not rebuild the subset of encoded data slices of the set of encoded data slices.

10. The method of claim 8, wherein determining whether to rebuild the at least one encoded data slice is further based on a reliability goal.

11. A processing system of a storage network comprises:
    at least one processor;
    at least one memory that stores operational instructions, that when executed by the at least one processor cause the processing system to perform operations that include:
        encoding, via a dispersed error encoding, at least one data object as a write threshold number of encoded data slices;
        storing the write threshold number of the encoded data slices in a set of storage units of the storage network;
        determining when, due to a failure of at least one of the set of storage units, less than a pillar width number of the encoded data slices of a common revision are retrievable from the set of storage units:
            retrieving a decode threshold number of the encoded data slices from others of the set of storage units;
            decoding the decode threshold number of the encoded data slices to reproduce the at least one data object;
            restoring availability of the pillar width number of the encoded data slices of the common revision by:
                rebuilding at least a subset of encoded data slices of the set of encoded data slices, based on an encoding of the at least one data object; and
                storing the at least a subset of encoded data slices in the storage network.

12. The processing system of claim 11, wherein determining when less than the pillar width number of encoded data slices are available includes invoking a list query to the set of storage units and comparing query responses received from the set of storage units.

13. The processing system of claim 11, wherein retrieving the decode threshold number of encoded data slices includes generating at least the decode threshold number of read slice requests for transmission to the set of storage units, and receiving the at least the decode threshold number of encoded data slices from the set of storage units in response.

14. The processing system of claim 11, wherein determining when less than the pillar width number of encoded data slices are available includes determining when less than the pillar width number of the set of encoded data slices of a common revision are retrievable from the set of storage units.

15. The processing system of claim 14, wherein the operations further include:
    identifying dispersal parameters associated with the set of encoded data slices, wherein the dispersal parameters include the decode threshold number.

16. The processing system of claim 15, wherein identifying the dispersal parameters includes reading an encoded data slice of the set of encoded data slices and extracting the dispersal parameters from the encoded data slice.

17. The processing system of claim 16, wherein retrieving the decode threshold number of encoded data slices is performed when the less than the pillar width number includes at least the decode threshold number of encoded data slices.

18. The processing system of claim 17, wherein the operations further include:
determining whether to rebuild the subset of encoded data slices of the set of encoded data slices based on determining whether combining the at least one encoded data slice with the less than the pillar width number of encoded data slices reforms a full pillar width number of encoded data slices.

19. The processing system of claim 18, wherein the operations further include:
encoding the at least one data object to reproduce the set of encoded data slices and facilitating storage of the reproduced set of encoded data slices in the set of storage units in accordance with a new revision when it is determined to not rebuild the subset of encoded data slices of the set of encoded data slices.

20. The processing system of claim 18, wherein determining whether to rebuild the at least one encoded data slice is further based on a reliability goal.

* * * * *